United States Patent
Kanakasabai et al.

(10) Patent No.: US 12,351,436 B2
(45) Date of Patent: Jul. 8, 2025

(54) STRUCTURAL HEALTH MONITORING SYSTEM FOR MATERIAL HANDLING SYSTEMS

(71) Applicant: KONECRANES GLOBAL CORPORATION, Hyvinkää (FI)

(72) Inventors: Pugazhendhi Kanakasabai, Pewaukee, WI (US); Deepak Kumar Gupta, Menomonee Falls, WI (US); Kyle Nicholas Puisto, Oconomowoc, WI (US)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 277 days.

(21) Appl. No.: 17/791,832

(22) PCT Filed: Jan. 9, 2020

(86) PCT No.: PCT/US2020/012884
§ 371 (c)(1),
(2) Date: Jul. 8, 2022

(87) PCT Pub. No.: WO2021/141588
PCT Pub. Date: Jul. 15, 2021

(65) Prior Publication Data
US 2023/0041995 A1 Feb. 9, 2023

(51) Int. Cl.
*B66C 13/16* (2006.01)
*B66C 15/06* (2006.01)
(Continued)

(52) U.S. Cl.
CPC ............ *B66C 13/16* (2013.01); *B66C 15/065* (2013.01); *B66C 17/00* (2013.01); *G01M 5/0041* (2013.01)

(58) Field of Classification Search
CPC ... B66F 17/00; B66F 9/07559; G01M 5/0041; B66C 13/16; B66C 15/065; B66C 17/00;
(Continued)

(56) References Cited

U.S. PATENT DOCUMENTS 4,280,363 A * 7/1981 Johansson ............. G01L 1/2225
177/136
6,441,324 B1 8/2002 Stimpson
(Continued)

FOREIGN PATENT DOCUMENTS

CN 102436530 A 5/2012
CN 106276606 A 1/2017
(Continued)

OTHER PUBLICATIONS

17791832_2024-11-22_WO_2006018276_A1_M = machine translation of WO-2006018276-A1 (Year: 2006).*
(Continued)

*Primary Examiner* — Huy Q Phan
*Assistant Examiner* — Martin Walter Braunlich
(74) *Attorney, Agent, or Firm* — Michael Best & Friedrich LLP

(57) ABSTRACT

A health monitoring system for a crane (10) includes a wheel assembly (50, 70) having a wheel (120) with an axle (160) defining an axis (172) of rotation of the wheel. The health monitoring system further includes a plurality of strain gauges (208) coupled to the axle at circumferential locations around the axis of rotation. The strain gauges continuously detect strains experienced at the wheel. The health monitoring system further includes a data acquisition system (200) coupled to the wheel that receives data from the strain gauges corresponding to detected strains. The health monitoring system further includes a main controller (204) coupled to the data acquisition system. The main controller
(Continued)

receives data from the data acquisition system corresponding to the detected strains, uses the data to calculate loading applied to the wheel assembly continuous in real-time in both a first direction, a second direction perpendicular to the first direction, and a third direction perpendicular to both the first direction and the second direction.

19 Claims, 12 Drawing Sheets

(51) Int. Cl.
    *B66C 17/00* (2006.01)
    *G01M 5/00* (2006.01)
(58) Field of Classification Search
    CPC ......... B66C 15/06; B66C 15/00; B66C 23/88; B66C 23/905; G01G 19/12; G01G 19/042; B60W 2420/22; G01L 5/0019; G01N 2203/0069; G01N 2203/0075
    See application file for complete search history.

(56) References Cited

U.S. PATENT DOCUMENTS

| | | | |
|---|---|---|---|
| 6,622,877 B2 * | 9/2003 | Plass | B66C 17/00 384/255 |
| 6,769,315 B2 | 8/2004 | Stevenson et al. | |
| 7,926,362 B2 * | 4/2011 | Andersson | G01L 5/1627 73/862.041 |
| 8,631,829 B1 * | 1/2014 | Bennett | B29C 66/532 138/104 |
| 8,874,329 B2 | 10/2014 | Zinke | |
| 9,156,662 B2 * | 10/2015 | Hakkarainen | B66C 9/16 |
| 9,365,398 B2 | 6/2016 | Benton et al. | |
| 10,207,904 B2 | 2/2019 | Morath et al. | |
| 10,507,826 B2 * | 12/2019 | Giorgio Bort | B60W 50/14 |
| 11,286,979 B2 * | 3/2022 | Rossberger | B62M 6/50 |
| 11,499,862 B2 * | 11/2022 | Wike | B61F 5/06 |
| 2008/0271541 A1 | 11/2008 | Neuman | |
| 2010/0044332 A1 | 2/2010 | Cameron | |
| 2015/0076100 A1 * | 3/2015 | Ellicott | B66C 15/065 212/278 |
| 2018/0205905 A1 | 7/2018 | Hammar et al. | |
| 2022/0252473 A1 * | 8/2022 | Michiwaki | G01M 99/00 |

FOREIGN PATENT DOCUMENTS

| | | | |
|---|---|---|---|
| CN | 106777737 A | 5/2017 | |
| CN | 107399672 A | 11/2017 | |
| EP | 2511677 A1 | 10/2012 | |
| EP | 2910911 A1 | 8/2015 | |
| EP | 2962550 A1 | 1/2016 | |
| EP | 3072846 A1 | 9/2016 | |
| EP | 2511678 B1 | 11/2016 | |
| RU | 2536763 C1 | 12/2014 | |
| WO | WO-2006018276 A1 * | 2/2006 | ............... B66D 1/58 |
| WO | 2007082931 A1 | 7/2007 | |
| WO | 2015036558 A1 | 3/2015 | |
| WO | 2018091782 A1 | 5/2018 | |

OTHER PUBLICATIONS

Gupta et al., "Input Load Identification from Optimally Placed Strain Gages Using D-optimal Design and Model Reduction," Mechanical Systems and Signal Processing, 2013, 40(2): pp. 556-570.

Masroor et al., "Designing an All-purpose Force Transducer," Experimental Mechanics, 1991, 31(1): 33-35.

Dhingra et al., "Load Recovery in Components Based on Dynamic Strain Measurements," Journal of Vibration and Acoustics, 2013, 135(5): 8 pages.

Li et al., "Comparison Analysis of Fiber Bragg Grating and Resistance Strain Gauge used in Quayside Container Crane Structure Health Monitoring," Applied Mechanics and Materials, 2013, vol. 330, pp. 485-493.

Kheiralla et al., "Design and Development and Calibration of an On-board Weighing System for an Industrial Wheel Loader," International Conference on Trends in Industrial and Mechanical Engineering, 2012, pp. 174-180.

Tripero et al., "Weight on Wheel System Based on Strain Gauges," 28th International Congress of the Aeronautical Sciences, 2012, 9 pages.

Intercomp, "PT300DW™ Wheel Load Scales," retrieved from <https://www.intercompcompany.com/pt300dw-wheel-load-scales-p-10145.html> web page visited Mar. 6, 2019.

Zelić et al., "Experimental Determination of Lateral Forces Caused by Bridge Crane Skewing During Travelling," Maintenance and Reliablility, 2018, 20(1): pp. 90-99.

International Search Report and Written Opinion for Application No. PCT/US2020/012884 dated Oct. 2, 2020 (15 pages).

International Preliminary Report on Patentability for Application No. PCT/US2020/012884 dated May 30, 2022 (7 pages).

Gupta et al., "A Reduced Modal Parameter Based Algorithm to Estimate Excitation Forces from Optimally Placed Accelerometers," Inverse Problems in Science and Engineering, 2017, 25(3): pp. 397-417.

* cited by examiner

STRUCTURAL HEALTH MONITORING SYSTEM FOR MATERIAL HANDLING SYSTEMS

FIELD OF INVENTION

The present invention relates to a material handling system, and more specifically, to a crane health monitoring system that measures a crane's wheel loads.

BACKGROUND

Material handling systems, such as cranes, are commonly used to lift objects (e.g., casks) and move the objects from a first location to a second location. A lift mechanism is commonly provided on the crane for lifting of the object. Additionally, the crane commonly includes a plurality of wheel assemblies with wheels for movement of the crane along rails, particularly with overhead cranes. During use of the crane, the wheels experience primary vertical loads that occur as a result of the weight of the object being lifted. However, the wheels may also experience secondary loads (e.g., loads from inertia and braking, environmental loads from wind or snow, loads from rail misalignment, loads from misalignment of the crane itself, loads from skewing, or various other loads that are directed in one or more different directions onto the wheels). Overall, these primary and secondary loads may affect the lifetime of the wheels and other crane components.

SUMMARY

In one construction, a health monitoring system for a crane includes a wheel assembly having a wheel with an axle defining an axis of rotation of the wheel. The health monitoring system further includes a plurality of strain gauges coupled to the axle at circumferential locations around the axis of rotation. The strain gauges continuously detect strains due to loads experienced at the wheel. The health monitoring system further includes a data acquisition system coupled to the wheel that receives data from the strain gauges corresponding to detected loads. The health monitoring system further includes a main controller coupled to the data acquisition system. The main controller receives data from the data acquisition system corresponding to the detected loads, uses the data to calculate loading applied to the wheel-rail interface in both a first direction, a second direction perpendicular to the first direction, and a third direction perpendicular to both the first direction and the second direction.

In another construction, crane includes a guide rail, and a wheel assembly having a wheel with an axle defining an axis of rotation of the wheel, wherein the wheel moves along the guide rail along a first direction. The health monitoring system further includes a plurality of strain gauges coupled to the axle at circumferential locations around the axis of rotation. The strain gauges detect strains due to loads experienced at the wheel. The health monitoring system further includes a controller coupled to the strain gauges. The controller calculates lateral loads on the wheel along the rail in the direction of the crane travel, longitudinal loads on the wheel along a second direction that is perpendicular to the first direction and vertical loads on the wheel along the third direction that is perpendicular to both the first and second directions.

In another construction, a crane for use with a rail system includes a frame structure having at least one frame member, the frame member extending linearly between a first end and a second end to define a longitudinal axis of the crane. The frame structure moves in a first direction that is perpendicular to the longitudinal axis. The crane further includes a trolley movable along the frame structure in a second direction along the longitudinal axis, the trolley having a lift assembly. The lift assembly is movable in a third direction that is perpendicular to the first direction and the second direction. The crane further includes a plurality of wheel assemblies for facilitating the movement of the frame structure relative to the rails and the movement of the trolley relative to the frame structure, each wheel assembly including a wheel having an axle defining an axis of rotation. One of the wheel assemblies includes a health monitoring system having a plurality of strain gauges selectively positioned on the axle for rotation with the axle. The health monitoring system further includes a wireless transmitter positioned on the wheel flange and electrically coupled to the plurality of strain gauges, and a controller wirelessly coupled to the wireless transmitter. Data from the strain gauges is communicated in real time, via the wireless transmitter, to the controller. The controller determines forces on the wheel in the first direction, in the second direction, and in the third direction.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
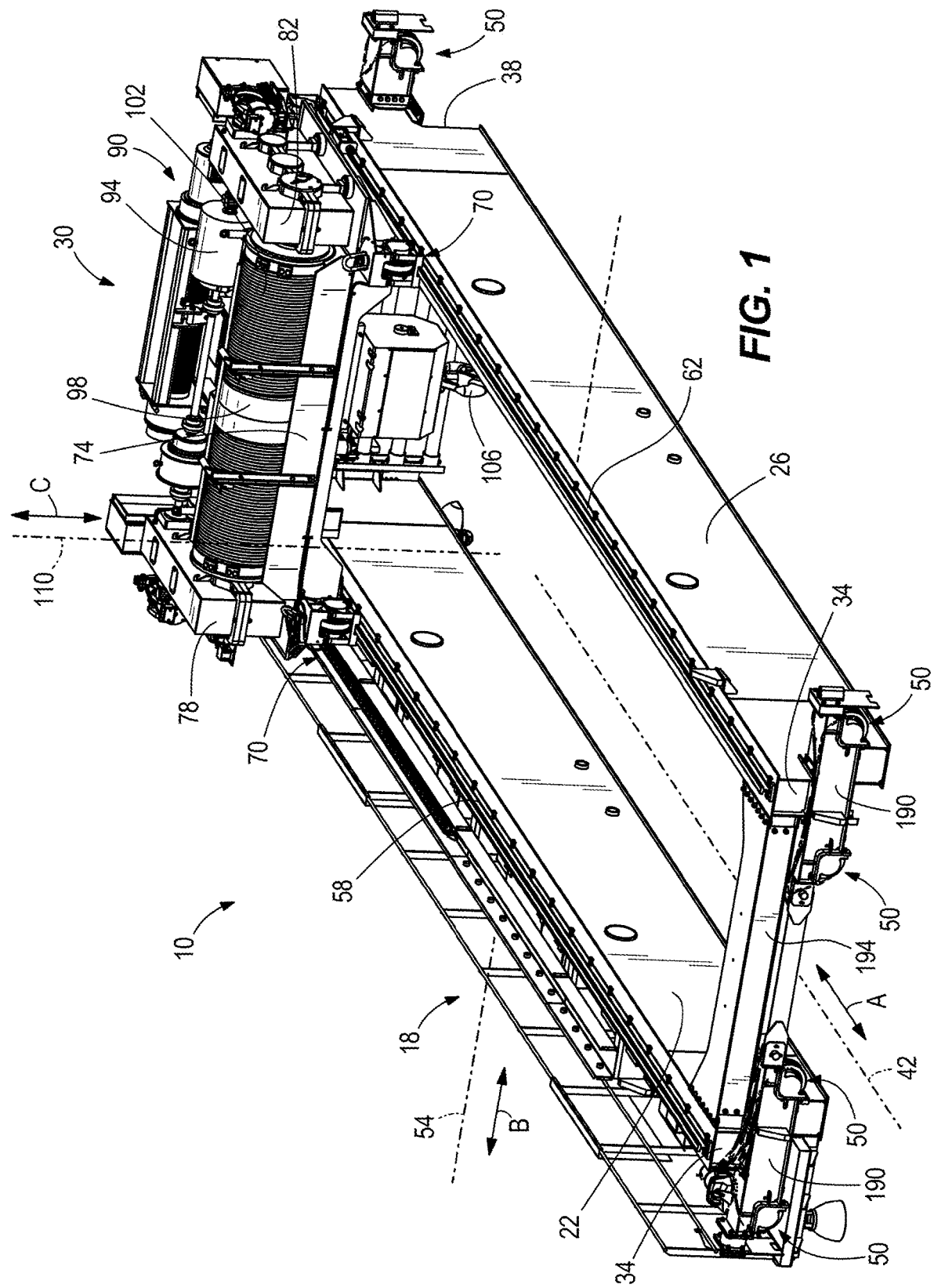
FIG. 1 is a front perspective view of a crane, illustrating a trolley and lift assembly supported on crane rails.

FIG. 1 illustrates a crane 10 for lifting and moving objects. In some constructions, the crane 10 is positioned partially or entirely within a building (e.g., warehouse, factory, etc.) so as to move objects within the building. The crane 10 is movable for example along a rail system in the building to selectively position the crane 10 at a predetermined location within the building, and move the objects within the building.

In the illustrated construction, the crane 10 includes a frame 18 having a first frame member 22, a second frame member 26, and a trolley 30 movably supported on the first and second frame members 22, 26. In other constructions, the frame 18 includes one frame member or more than two frame members (e.g., three, four, etc.). The first frame member 22 and the second frame member 26 each extend from a first end 34 to a second end 38 of the frame member generally along a longitudinal axis 42 of the frame 18. In the illustrated construction, the first frame member 22 is parallel to and spaced apart from the second frame member 26. Other constructions include different numbers and arrangements of frame members than that illustrated.

With continued reference to FIG. 1, the first frame member 22 and the second frame member 26 are movably supported by wheel assemblies 50 that are positioned generally at the first and second ends 34, 38 of the first and second frame members 22, 26. The wheel assemblies 50 are movable, for example, along a rail system of a building so as to move the entire crane 10 back and forth within the building. As illustrated in FIG. 1, the wheel assemblies 50 are oriented such that the first frame member 22 and the second frame member 26 are movable left and right (from the frame of reference of FIG. 1), generally along a lateral axis 54 that is perpendicular to the longitudinal axis 42. In some constructions, the frame 18 includes a motor (or a plurality of motors, not shown) operatively coupled to the plurality of wheel assemblies 50 for selectively moving the crane 10 overall back and forth along the lateral axis 54.

In the illustrated construction, the crane 10 includes eight wheel assemblies 50 (only five of which are shown in FIG. 1) that are positioned at the first and second ends 34, 38. Four wheel assemblies 50 are located at the first ends 34, and are arranged to support the crane 10 on one rail of a rail system in the building, and the remaining four wheel assemblies 50 are located at the second ends 38 and are arranged to support the crane 10 on a separate rail of the rail system in the building. In other constructions, the crane 10 includes two or more (e.g., four, six, ten, etc.) wheel assemblies 50 that are arranged to support the crane on a rail system and move the crane along the lateral axis 54.

With continued reference to FIG. 1, the first frame member 22 includes a first trolley rail 58 extending along a top of the first frame member 22 from the first end 34 to the second end 38 of the first frame member 22. Similarly, the second frame member 26 includes a second trolley rail 62 extending along a top of the second frame member 26 from the first end 34 to the second end 38 of the second frame member 26. The trolley 30 is movably supported by wheel assemblies 70 that move along the first and second trolley rails 58, 62, so as to move the trolley 30 back and forth along a top of the crane 10.

As illustrated in FIG. 1, the trolley 30 includes a base 74 extending between the first and second frame members 22, 26. The base 74 includes a first end 78 and a second end 82 opposite the first end 78 along the lateral axis 54. The first end 78 and the second end 82 are movably supported on the first and second frame members 22, 26, respectively. The wheel assemblies 70 are generally positioned along the base 74 at the first and second ends 78, 82 of the base 74. Accordingly, the trolley 30 is movable forward and backward along the trolley rails 58, 62 and along the longitudinal axis 42 (from the frame of reference of FIG. 1). With this arrangement, the trolley 30 is therefore movable in a first linear direction A, and the crane 10 overall is separately movable in a second linear direction B that is perpendicular to the first linear direction A. Other constructions include different arrangements of frame members and/or trolleys than that illustrated. For example, in some constructions, the crane 10 does not include a trolley that is separately movable along the frame members 22, 26. Rather, the crane 10 is only movable via the wheel assemblies 50 along the direction B. In some constructions, the trolley 30 is movable along a direction that is perpendicular to the direction A, or along another direction. In some constructions, the crane 10 includes more than one trolley, and/or more or less than the two trolley rails 58, 62 illustrated.

With continued reference to FIG. 1, in the illustrated construction, the trolley 30 further includes a lift mechanism 90 supported by the base 74. The lift mechanism 90 includes a motor 94, a drum 98 (e.g., winch drum) operatively coupled to the motor 94, and a cable member 102 wrapped around the drum 98. A hook 106 is positioned at an end of the cable member 102. The lift mechanism 90 moves the hook 106 along a vertical axis 110 that is perpendicular to the longitudinal and lateral axes 42, 54. For example, in the illustrated construction, the hook 106 is moved up and down in a vertical direction C. The hook 106 is arranged to selectively couple to an object (e.g., cask, barrel, etc.) for movement of the object from one location within the building structure to another location. The weight of the object pulls down vertically on the trolley 30 and thus imparts a vertical load on the wheel assemblies 70 that ride along the trolley rails 58, 62, as well as on the wheel assemblies 50 that ride for example on rails within the building. In other constructions, the crane 10 includes a lift mechanism other than illustrated.

Figure 2:
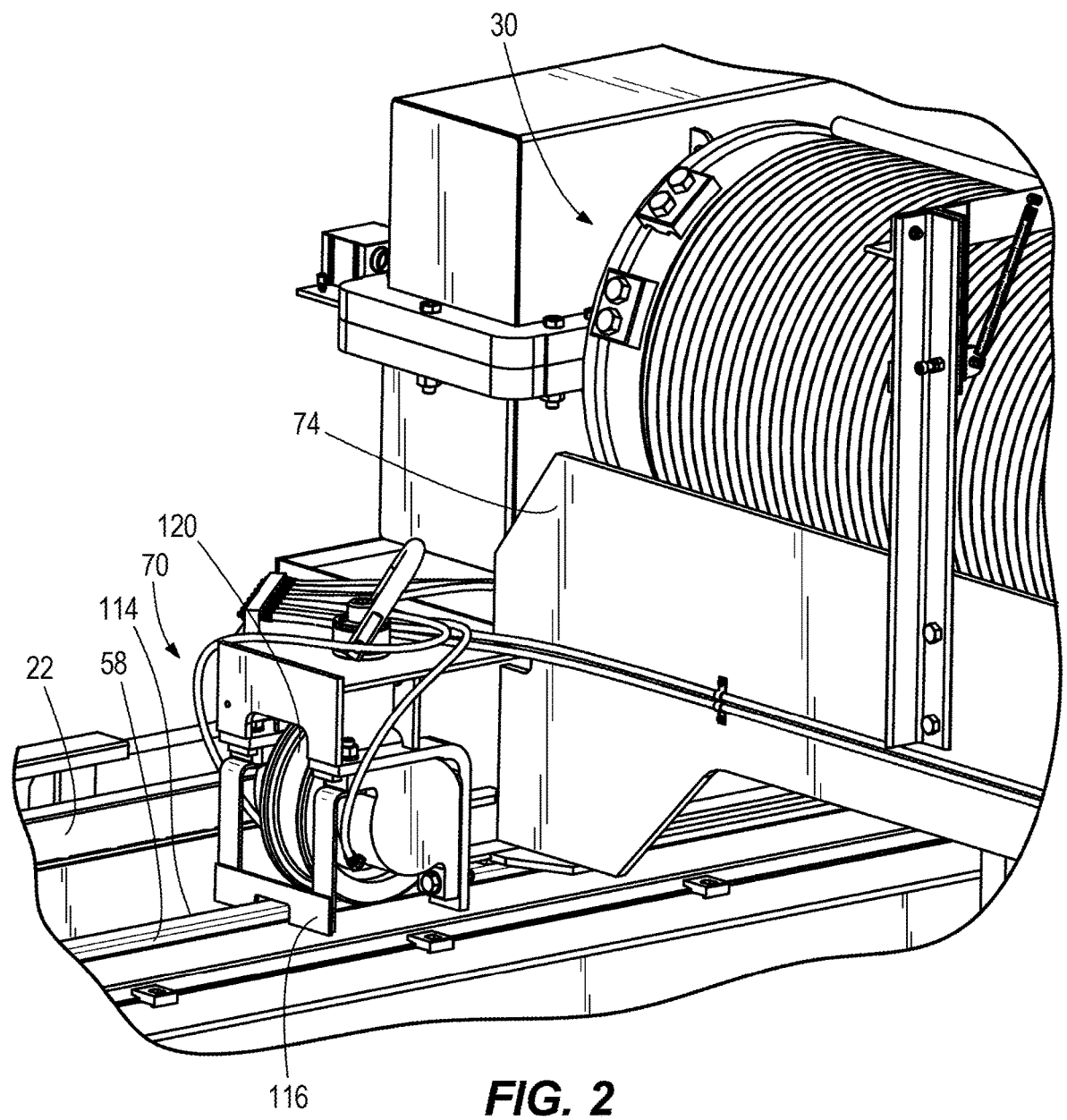
FIG. 2 is an enlarged, perspective view of a portion of a wheel assembly on one of the crane rails of FIG. 1.

With reference to FIG. 2, in the illustrated construction, each of the trolley rails 58, 62 includes a guide region 114 (e.g., rail head) positioned on a top side of the trolley rail 58, 62. The guide region 114 is sized and shaped to support the wheel assemblies 70 of the trolley 30 as the wheel assemblies 70 travel along the trolley rails 58, 62. For example, in the illustrated construction, the guide region 114 has a T-shape. Other constructions include different shapes and sizes than that illustrated. With continued reference to FIG. 2, in some constructions, the trolley 30 additionally includes rail sweeps 116 coupled to the wheel assemblies 70. The rail sweeps 116 include cutout regions that are shaped to fit around the guide regions 114.

In the illustrated construction, the wheel assemblies 50 (for riding along the rails on a civil structure) are generally identical to the wheel assemblies 70 (for riding along the trolley rails 58, 62). FIGS. 3-8 therefore illustrate one of the wheel assemblies 50, 70 of the crane 10. In other constructions, one or more of the wheel assemblies 50 may be different than one or more of the wheel assemblies 70.

Figure 3:
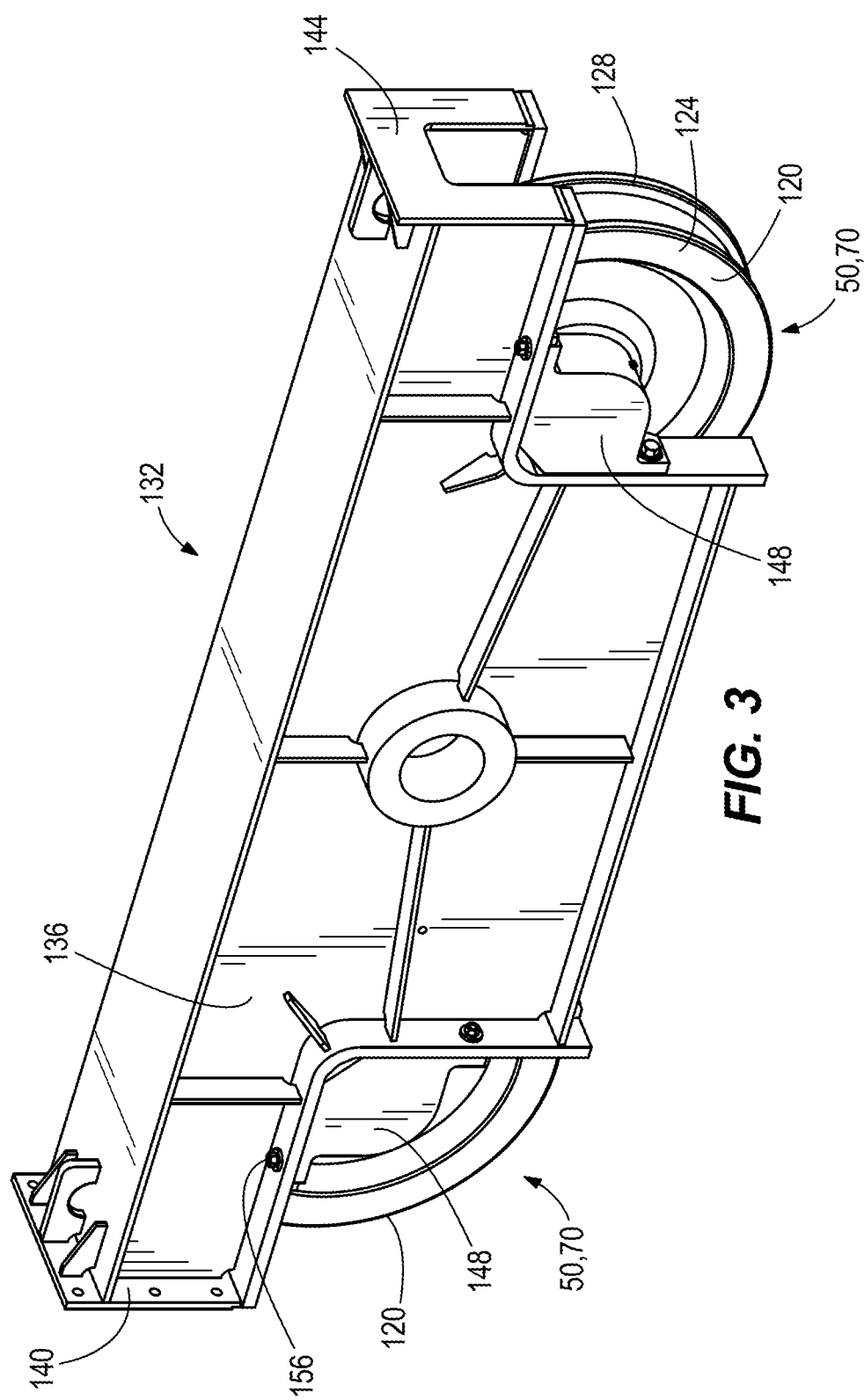
FIG. 3 is a perspective view of the wheel assembly of FIG. 2.

With reference to FIGS. 2-3, each wheel assembly 50, 70 includes a wheel 120. Each wheel 120 includes a first wheel flange 124 and a second wheel flange 128 spaced apart from the first wheel flange 124. This shape or profile allows the wheel 120 to fit for example over the guide region 114 on the trolley rail 58, 62 (or to ride along the rails on a civil structure).

Figure 2A:
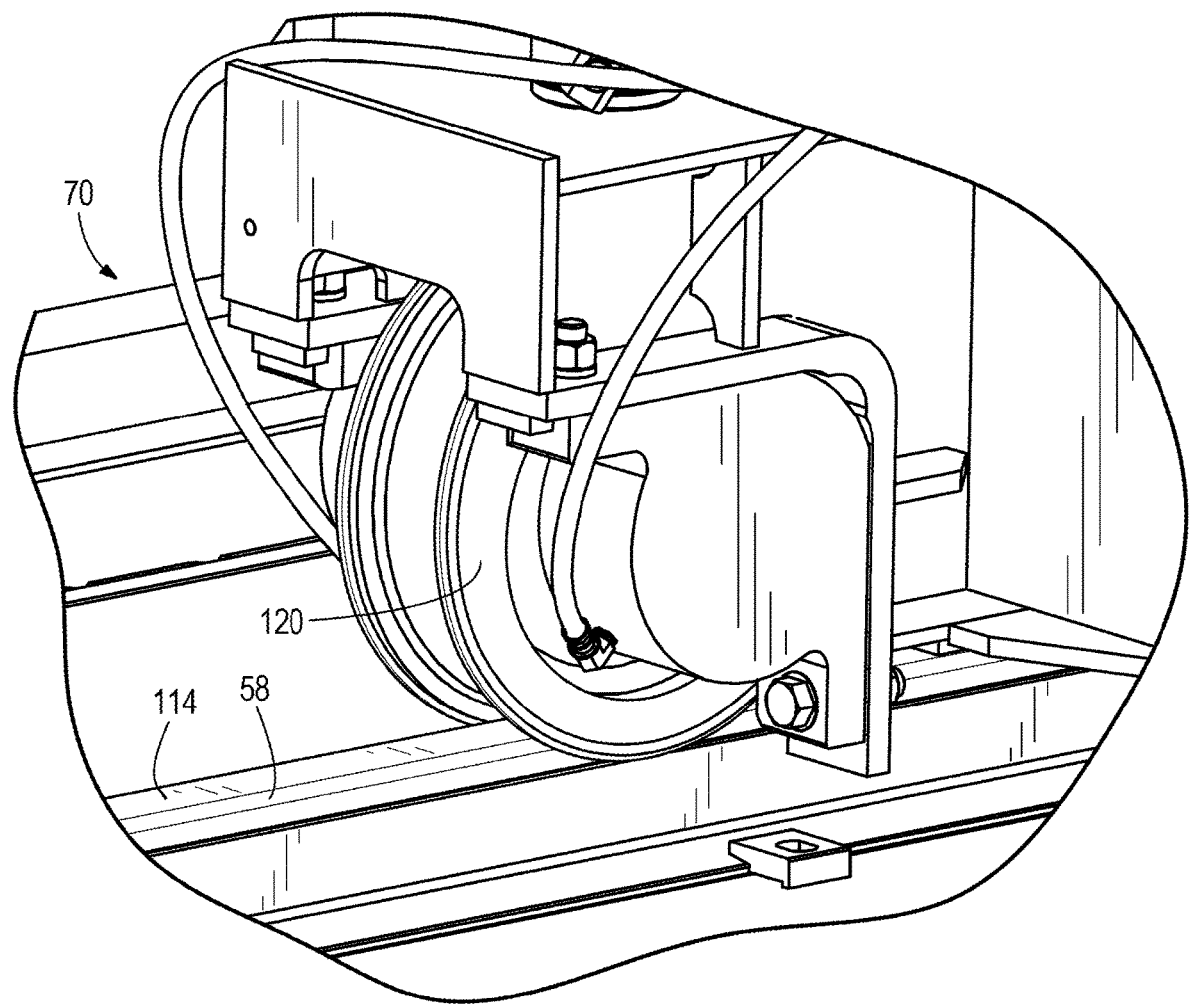
FIG. 2A is a further, enlarged perspective view of the portion of the wheel assembly of FIG. 2, with a rail sweep removed.
Figure 2B:
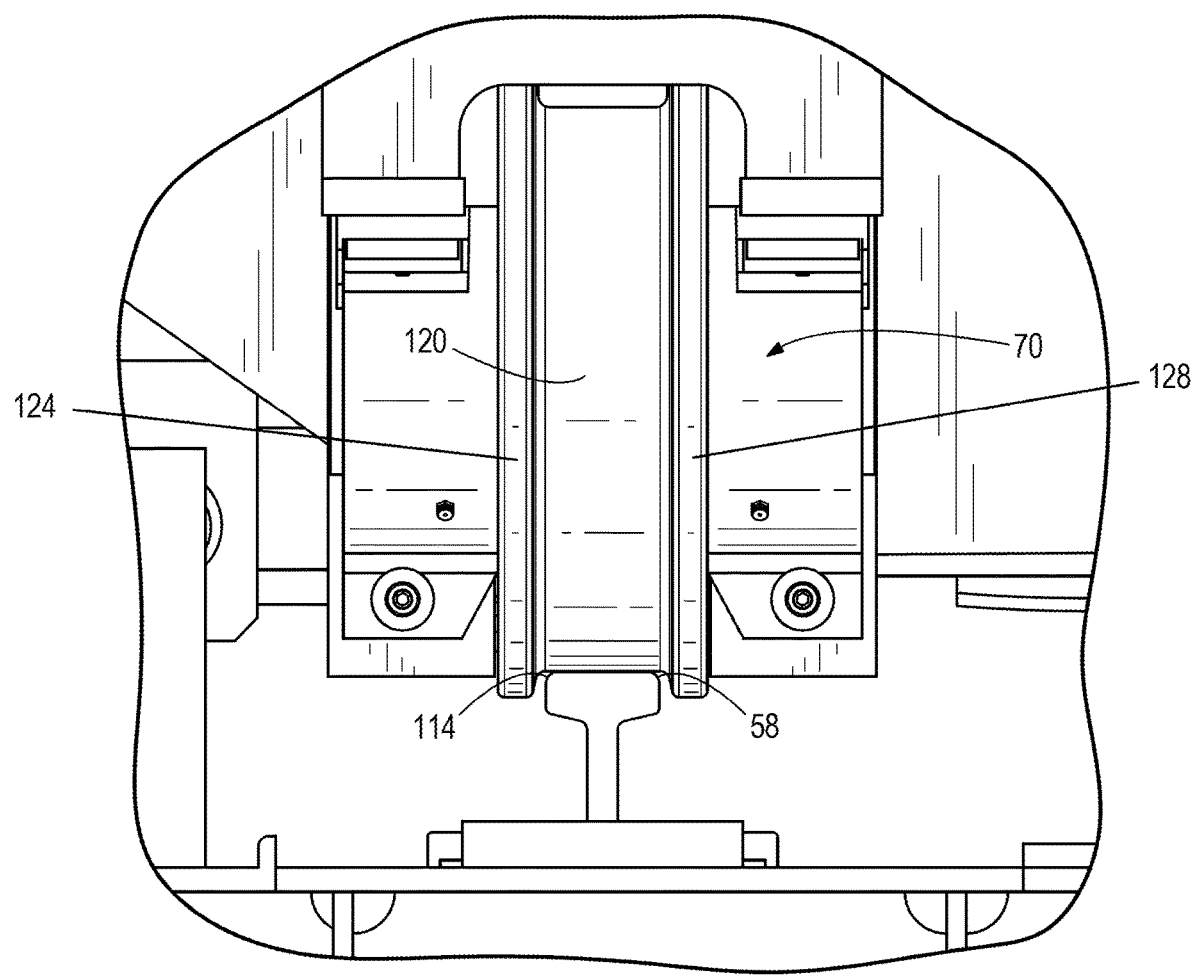
FIG. 2B is a front view of the portion of the wheel assembly of FIG. 2A.

For example, and with reference to FIGS. 2A and 2B, the wheel 120 sits over the guide region 114 (e.g., rail head). As illustrated in FIG. 2B, the guide region 114 has a width that is slightly smaller than a width between the first wheel flange 124 and the second wheel flange 128, such that there is at least a small amount of play or room for lateral movement (i.e., left and right in FIG. 2B) of the wheel as it travels along the guide region 114. In some constructions the first wheel flange 124 and/or the second wheel flange 128 may rub or slide against the guide region 114 during use, causing some stress to the wheel 120. If the guide region 114 is misaligned, or if the wheel 120 is misaligned, such stress may be more significant along one portion of the wheel 120, or along one particular direction as opposed to another.

Figure 4:
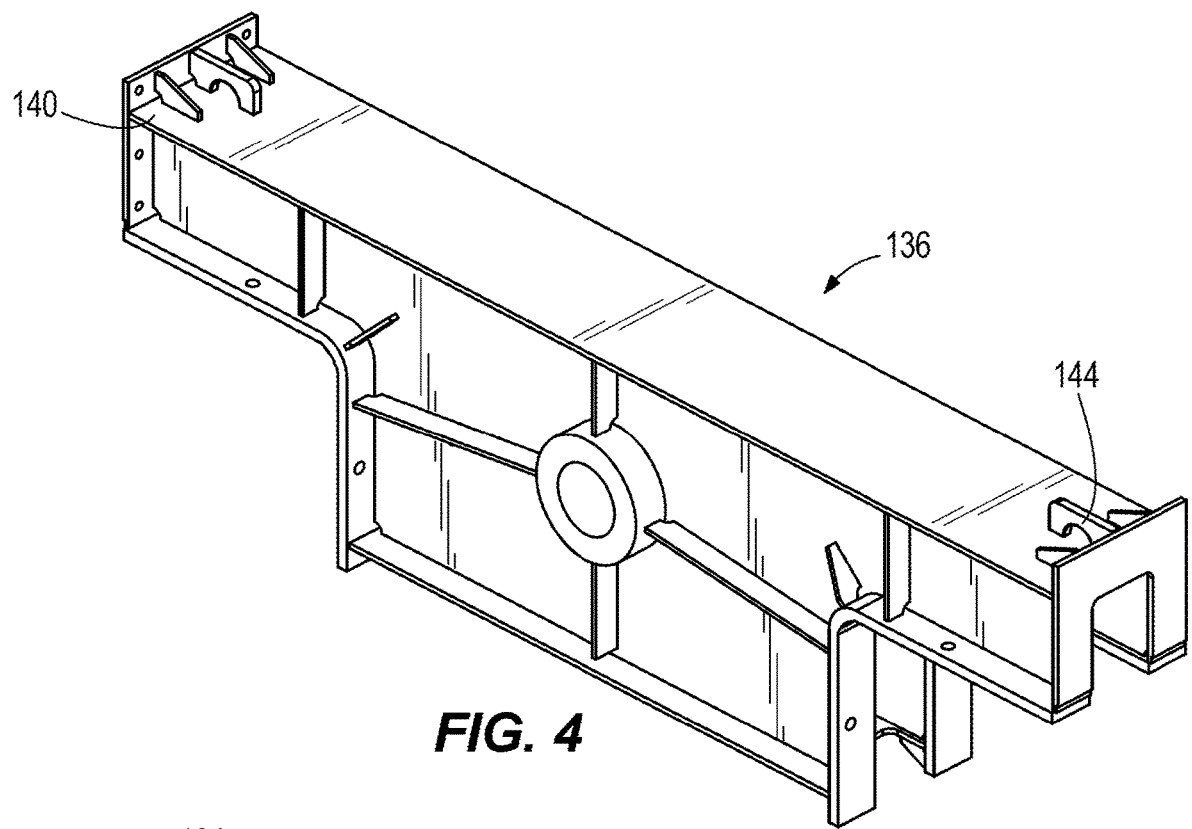
FIG. 4 is a perspective view of a support member of the wheel assembly of FIG. 2.
Figure 5:
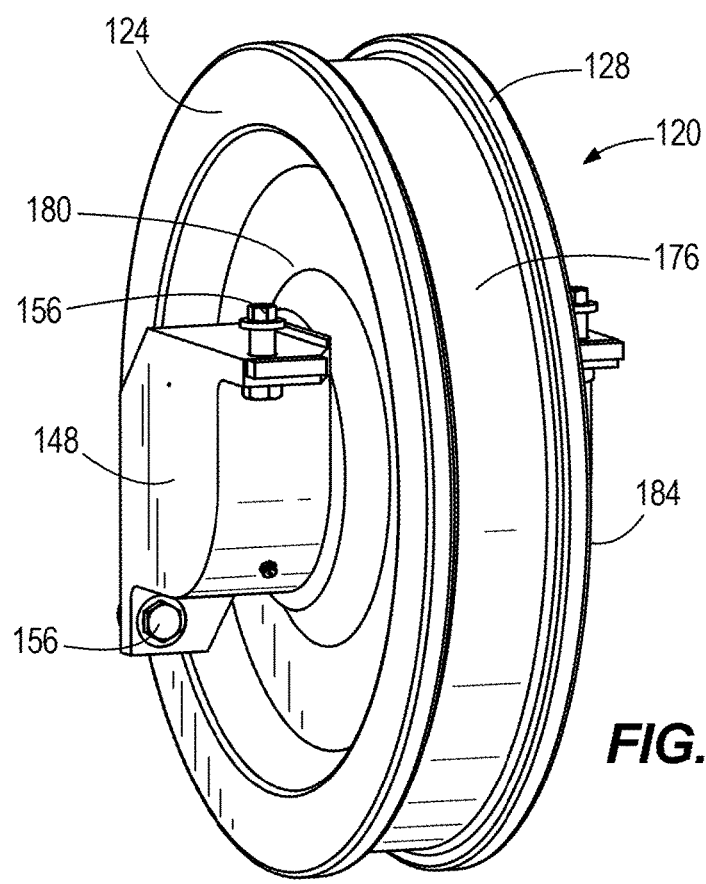
FIG. 5 is a perspective view of a portion of the wheel assembly of FIG. 2, illustrating a wheel and first and second retainer members.
Figure 6:
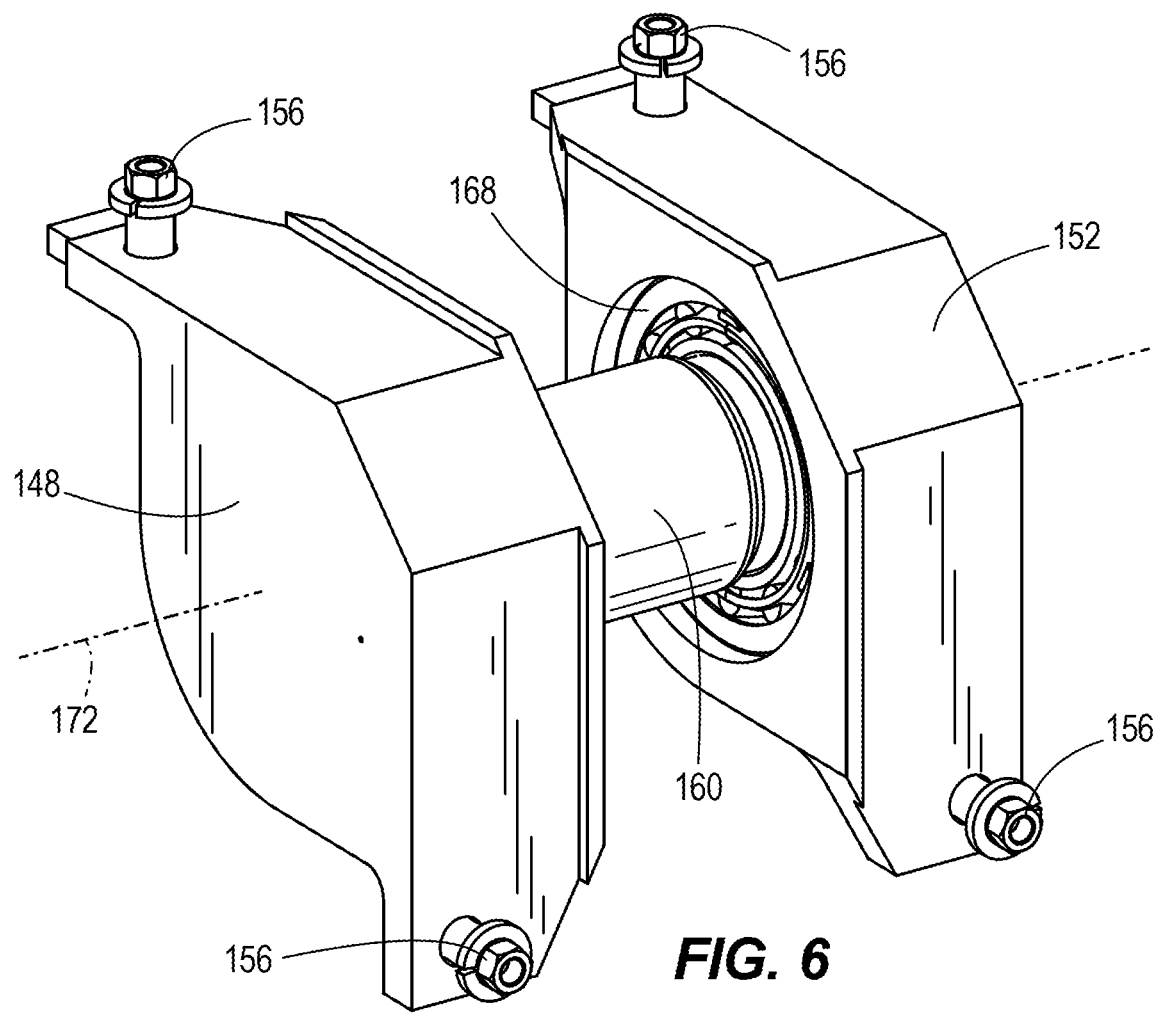
FIG. 6 is a perspective view of a portion of the wheel assembly of FIG. 5, illustrating a wheel axle and the first and retainer members.

With reference to FIGS. 3-6, each wheel assembly 50, 70 is coupled to a support structure 132 (which may function in a similar manner to the integrated wheel support structures 78 & 82 on the trolley 30). In the illustrated construction, a single support structure 132 supports two wheels assemblies 50, 70. The illustrated support structure 132 includes a support member 136 (e.g., frame as seen in FIG. 4) that extends between a first end 140 and a second end 144, and first and second retainer members 148, 152 (e.g., bearing housings as seen in FIGS. 3, 5, and 6) that are fixed to the support member 136 with fasteners 156.

Figure 7:
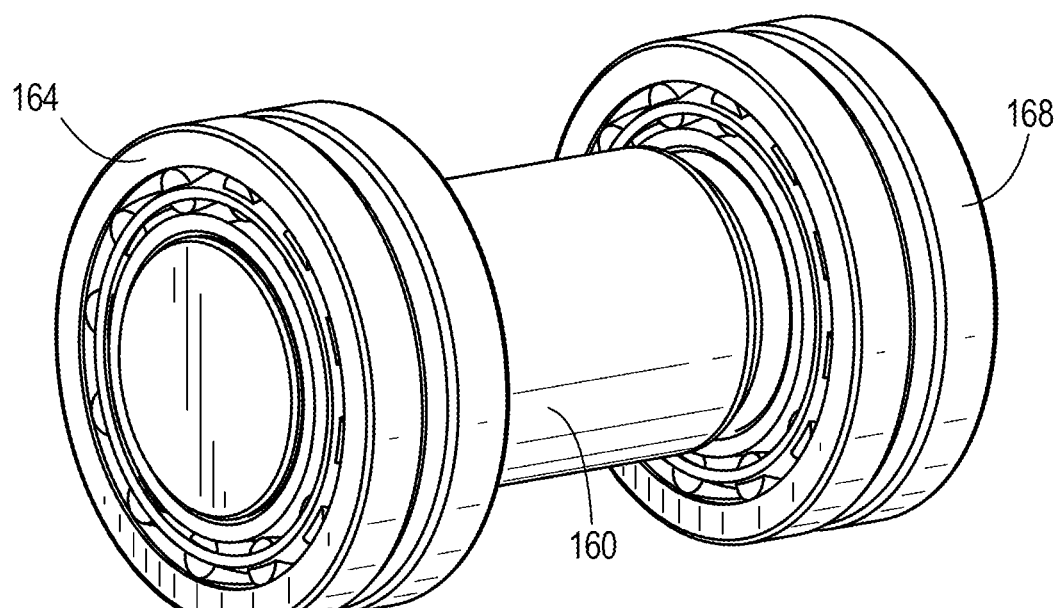
FIG. 7 is a perspective view of a portion of the wheel assembly of FIG. 6, illustrating the wheel axle and first and second wheel bearings.
Figure 8:
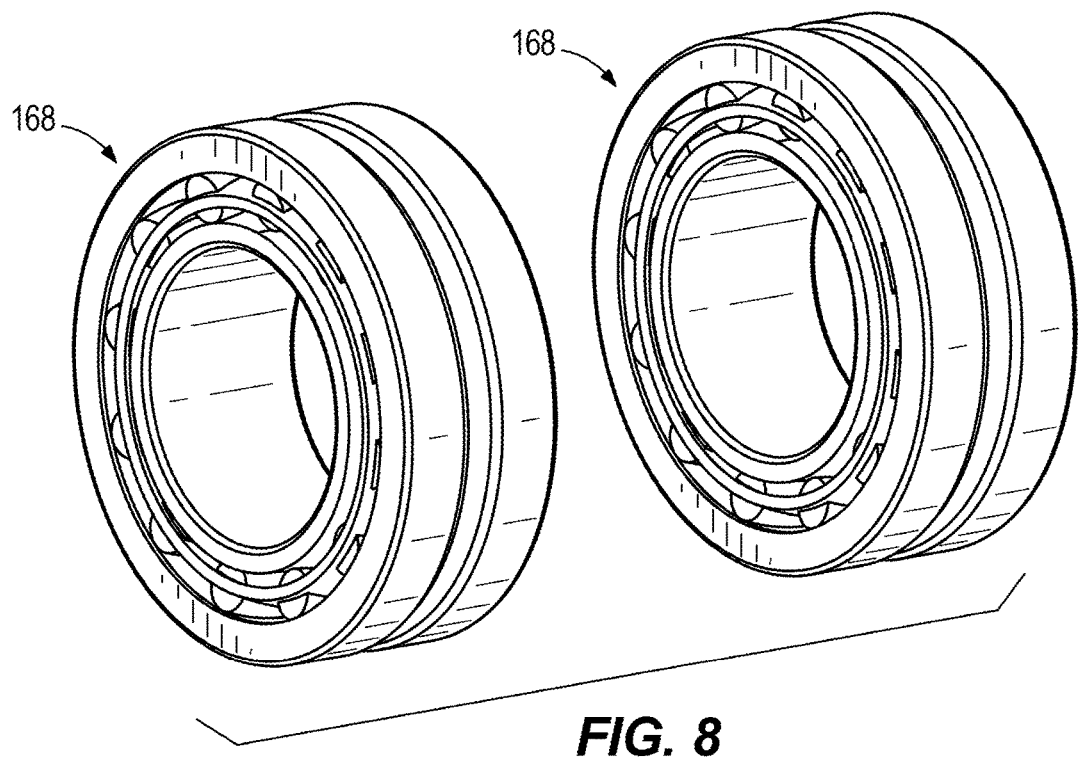
FIG. 8 is a perspective view of a portion of the wheel assembly of FIG. 7, illustrating only the first and second bearings.

With reference to FIGS. 6-8, each wheel 120 includes an axle 160, and each wheel assembly 50, 70 further includes a first bearing 164 and a second bearing 168 positioned at opposite ends of the axle 160. The first and second bearings 164, 168 are received within the respective retainer members 148, 152. Each wheel 120 is thus positioned between two bearings 164, 168 and two retainer members 148, 152. As illustrated in FIG. 6, the axle 160 defines a rotational axis 172, and the wheel 120 and the first and second bearings 164, 168 are aligned along the rotational axis 172. As such, each axle 160 (and each wheel 120) is rotatably supported on the support member 136 via the bearings 164, 168.

With reference to FIG. 5, the wheel 120 of each wheel assembly 50, 70 includes a guiding groove 176, and first and second side surfaces 180, 184. In the illustrated construction, the first and second wheel flanges 124, 128 form the guiding groove 176. The first and second flanges 124, 128 are spaced apart to define a width along the rotational axis 172 of the axle 160 for forming the guiding groove 176. As described above, the guide region 114 of the respective rail has a complimentary width so as to fit within the guiding groove 176. The guide region 114 is received in the guiding groove 176 of the wheel 120. Accordingly, the guide region 114 and the guiding groove 176 facilitate the movement of the crane 10 overall (on the civil structure rail), or movement the trolley 30 along the trolley rails 58, 62.

With continued reference to FIG. 5, the first wheel flange 124 and the second wheel flange 128 include the first side surface 180 and the second side surface 184, respectively (only the first side surface 180 of which is shown). The first and second side surfaces 180, 184 face away from each other and toward the respective retainer member 148, 152.

During use of the crane 10, the wheels 120 experience vertical loads along the direction C (FIG. 1) that occur as a result of the weight of the object being lifted by the hook 106. However, as described above, the wheels of any crane, such as the wheels 120 of crane 10, may also experience secondary loads (e.g., loads from inertia and braking, environmental loads from wind or snow, loads from rail misalignment, loads from misalignment of the crane itself, loads from skewing, or various other loads that are directed in one or more different directions onto the wheels). Overall, these loads may affect the lifetime of the wheels 120, the wheel assemblies 50, 70 and other crane components including frame members 22 and 26. For this reason, and with reference to FIGS. 9-12, the crane 10 additionally includes a health monitoring system 186 that measures loading on at least one of the wheels 120 of at least one of the wheel assemblies 50, 70, and collects data related to the loading. The health monitoring system 186 uses the collected data, for example, to provide feedback to an operator regarding the structural health and integrity of the crane 10. In some constructions, and as described herein, the health monitoring system 186 gauges the crane's triaxial wheel loads as well as a relative position of wheel tread (e.g., the outer surface of the wheel that contacts the guide rail 114, or a surface or surfaces of the flanges 124, 128 on the wheel that are adjacent the guide rail 114) with respect to rail head width, which is then used to predict the lifetime of the wheels and other crane components.

Figure 9:
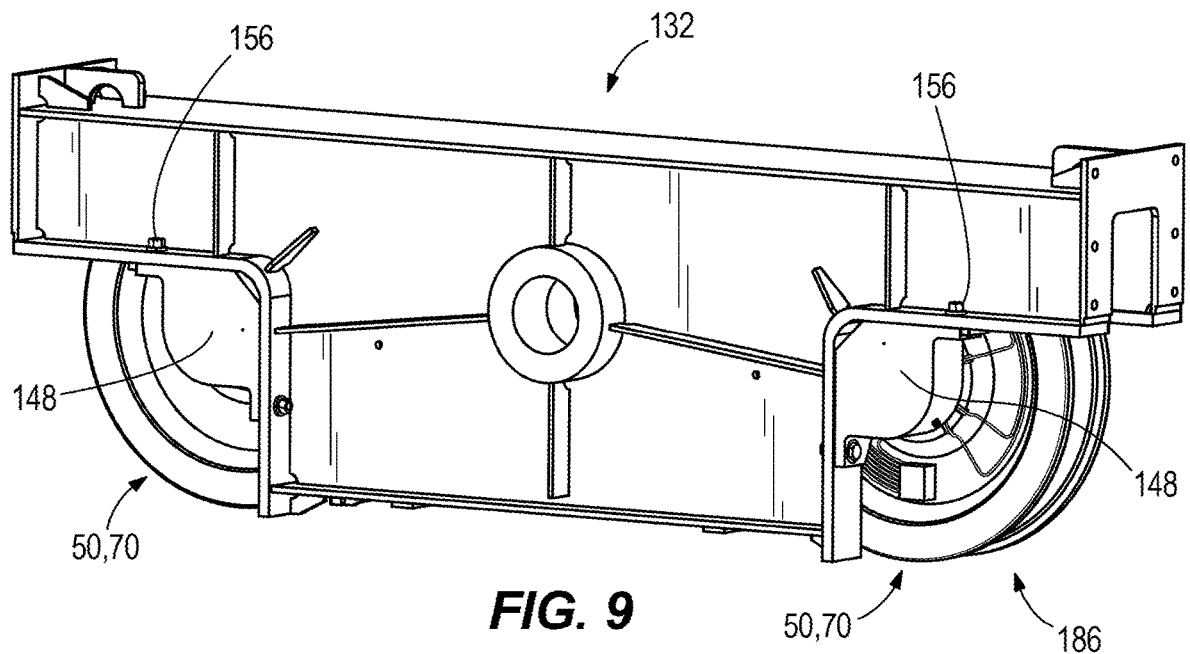
FIG. 9 is a perspective view of the wheel assembly of FIG. 2, illustrating a health monitoring system.
Figure 10:
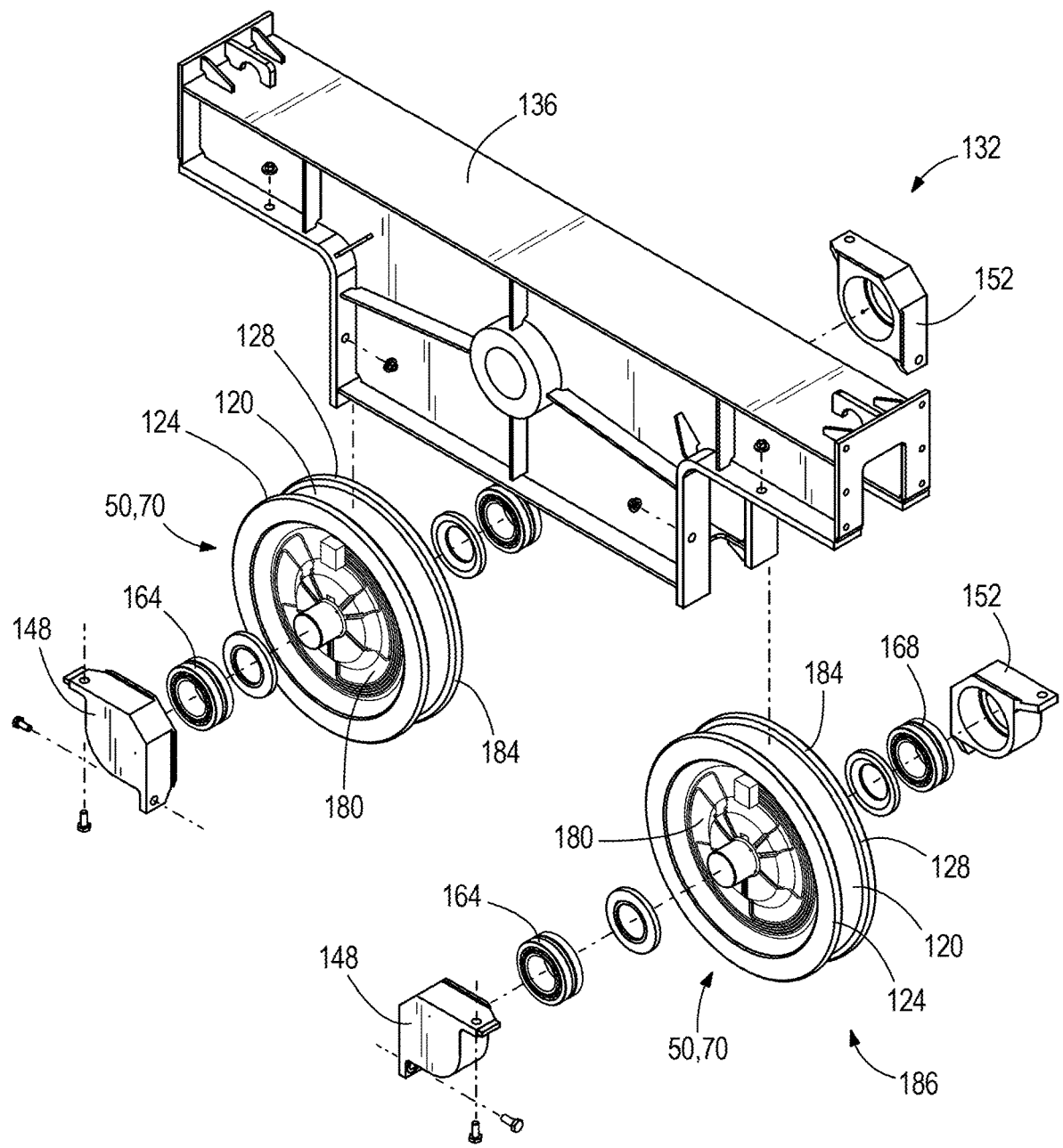
FIG. 10 is an exploded view of the wheel assembly and health monitoring system of FIG. 9.

With reference to FIGS. 9 and 10, the health monitoring system 186 includes sensors coupled directly to at least one of the wheels 120. For example, and with reference to FIGS. 11 and 12, in the illustrated construction at least one of the first and second side surfaces 180, 184 of the wheels 120 defines a plurality of channels 188 (for wiring) and/or cutouts 192 (e.g., at the wheel bore to provide access to the other side of the wheel). The illustrated channels 188 extend linearly from the axle 160 radially outwardly toward an outer circumference of each wheel flange 124, 128. In the illustrated construction, each side surface 180, 184 includes four channels 188, and each channel 188 is circumferentially spaced apart about the axle 160 (i.e., the rotational axis 172). In other constructions, each side surface 180, 184 includes between one and three channels, or more than four channels 188 positioned at any circumferential position on the respective side surface 180, 184.

Figure 11:
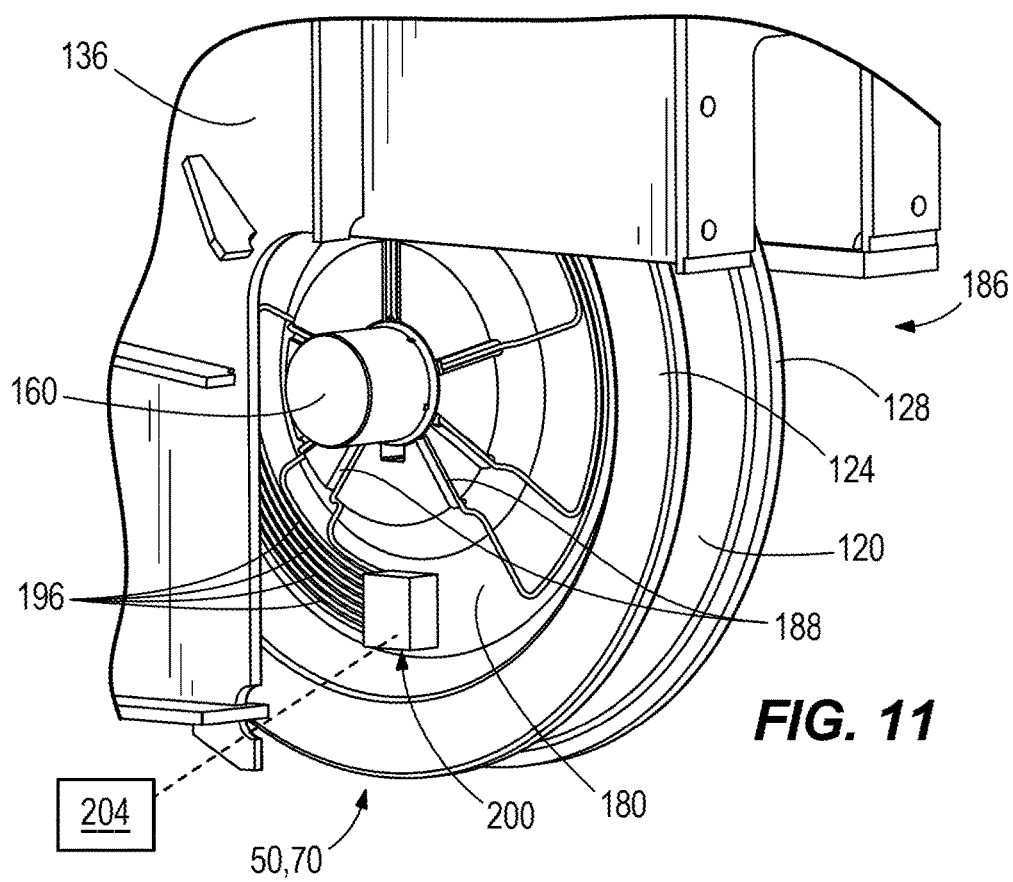
FIG. 11 is a perspective view of a portion of the wheel assembly and the health monitoring system.
Figure 12:
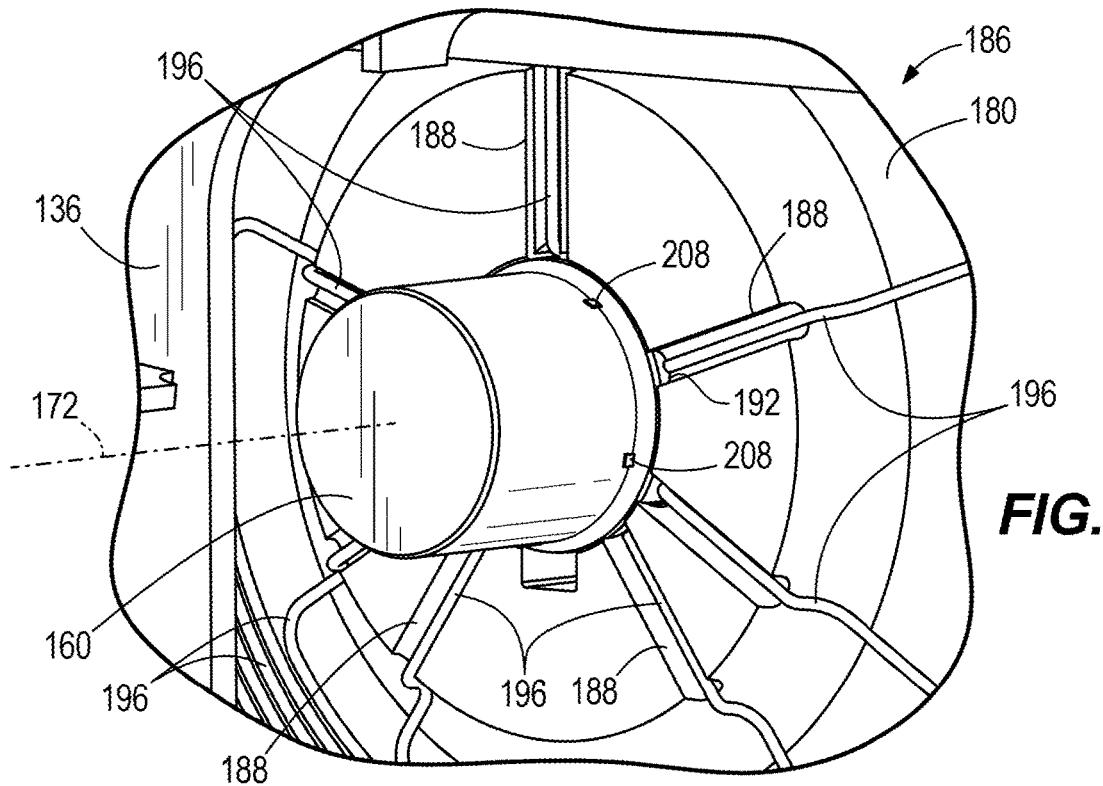
FIG. 12 is an enlarged perspective view of the health monitoring system.

With continued reference to FIGS. 11 and 12, the illustrated health monitoring system 186 includes one or more wires 196 that are received in the channels 188, and a data acquisition system 200 that is coupled to the wires 196 and fastened to the side surface 180, 184. In some constructions, the data acquisition system 200 includes a controller (e.g., microcontroller) having a plurality of electrical and electronic components that provide operational control and/or protection of the data acquisition system 200. The controller includes, among other things, an electronic processor, a memory, and a power source that may or may not be directly coupled to the controller.

The illustrated health monitoring system 186 additionally includes a main controller 204 (illustrated schematically in FIG. 11) coupled to the data acquisition system 200. In some constructions, and similar to the data acquisition system 200, the main controller 204 includes a controller having a plurality of electrical and electronic components (e.g., an electronic processor and memory) that provide operational control and/or protection of the main controller 204. In some constructions, the data acquisition system 200 and the main controller 204 are a single unit.

The illustrated health monitoring system 186 further includes strain gauges 208 (or other load-measuring sensors) that are coupled to the wires 196. The strain gauges 208 detect loads (e.g., normal or shear strains based on bending or other movement of the axle 160) on the wheels 120 and provide signals or other data related to the loading that are then transmitted through the wires 196 to the data acquisition system 200 and/or the main controller 204. In some constructions, the main controller 204 is positioned outside of the crane 10 (e.g., in a room of a building). The main controller 204 may be connected (e.g., via a wired and/or wireless connection) to the data acquisition system 200. In some constructions, the data acquisition system 200 includes a wireless transmitter for providing communication between the main controller 204 and the data acquisition system 200. The plurality of strain gauges 208 are electrically connected to the data acquisition system 200 (i.e., the wireless transmitter) via the wires 196.

With reference to FIG. 12, each of the strain gauges 208 is selectively positioned on the axle 160 of the respective wheel 120 such that the strain gauges 208 are coupled for co-rotation with the axle 160. Each strain gauge 208 is located at a predetermined circumferential location on the axle 160 relative to the rotational axis 172. In other constructions, one or more of the strain gauges 208 is located along the side surface 180, 184 of the wheel 120, or along the first wheel flange 124 or second wheel flange 128, or at another location on the wheel 120. In some constructions, the health monitoring system 186 includes five or more strain gauges 208 spaced equidistantly around the rotational axis 172 of one of the wheels 120. In this construction, the health monitoring system 186 includes eight strain gauges 208. For example, five of the eight strain gauges 208 may be positioned proximate the first wheel flange 124, and at angles of 0 degrees, 72 degrees, 144 degrees, 216 degrees, and 288 degrees, respectively, relative to the rotational axis 172. The remaining three strain gauges 208 may be positioned proximate the second wheel flange 128, and at angles of 24 degrees, 144 degrees, and 264 degrees, respectively, relative to the rotational axis 172. Other constructions include different numbers and arrangements of strain gauges 208, including different angles and spacing of the strain gauges 208 than that illustrated.

With continued reference to FIGS. 9-12, each strain gauge 208 outputs a signal, and the data acquisition system 200 receives each output signal. The data acquisition system 200 determines load data based on the output signals of each of the strain gauges 208, and passes that information along to the main controller 204. In some constructions, the data acquisition system 200 acquires and smooths data from the strain gauges 208. In some constructions, the strain gauges 208 are selectively positioned on the respective wheel assembly 50, 70 for measuring wheel load data relative to the longitudinal axis 42, the lateral axis 54, and the vertical axis 110. The load data is collected by the data acquisition system 200 and communicated in real time, via the wireless transmitter, to the main controller 204, so that loading in all three orthogonal directions may then be calculated by the main controller 204. In other constructions, the data acquisition system 200 itself calculates the loading.

Figure 13:
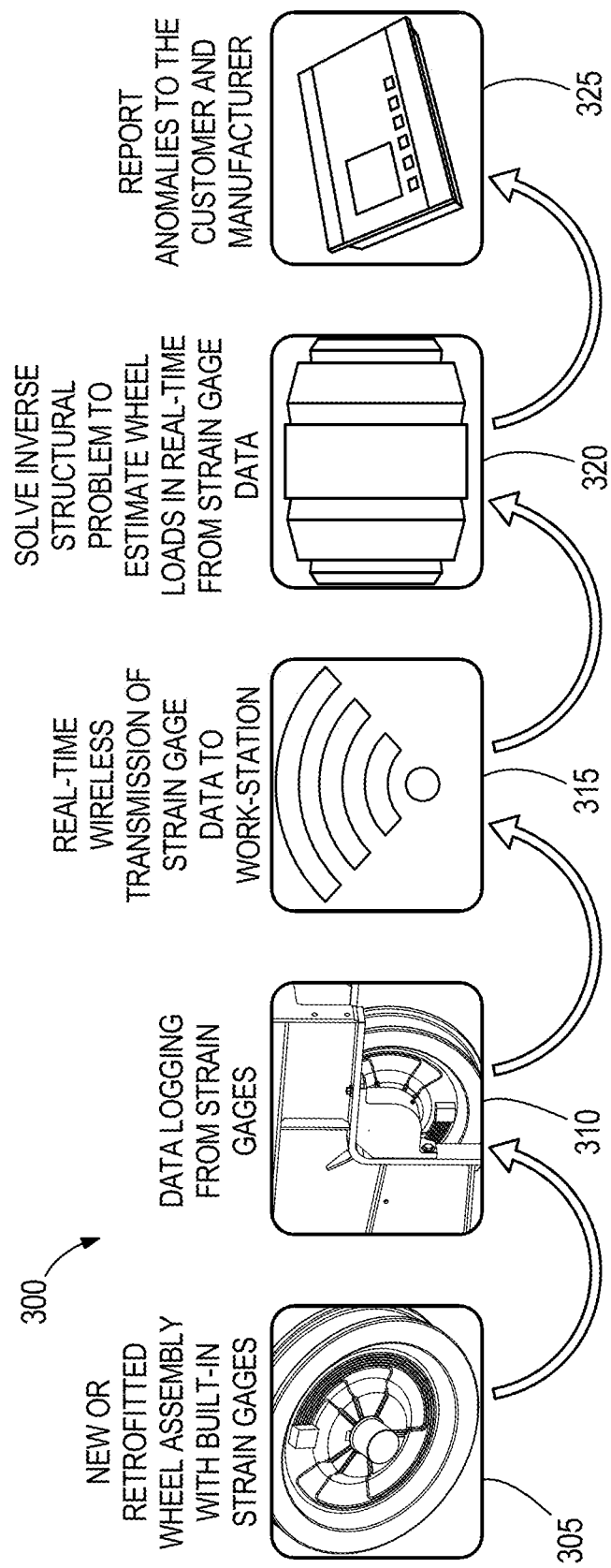
FIG. 13 is a flow diagram illustrating collection of data and use of the data from the health monitoring system.

FIG. 13 is a flow chart illustrating a process, or operation, 300 of the health monitoring system 186 according to some constructions. It should be understood that the order of the steps disclosed in the process 300 can vary. Furthermore, additional steps may be added and not all of the steps may be required, and the process 300 may be performed via, or in conjunction with, the data acquisition system 200 and/or the main controller 204.

With continued reference to FIG. 13, a strain gauge 208 (or other load-measuring element) is placed within a new or existing wheel assembly 50, 70 (block 305). One or more strain gauge 208 senses one or more characteristics (e.g., normal or shear strain) of the crane 10 (block 310). The one or more sensed characteristics are output to the data acquisition system 200 and/or the main controller 204 (block 315). As stated above, the one or more sensed characteristics may be output via wired and/or wireless communication.

The one or more sensed characteristics are analyzed to determine one or more loads on the wheel assemblies 50, 70 (block 320). The determined loads are then output to a user (block 325). In some constructions, the one or more determined loads are output to the user via a user-interface remote from the crane 10 (for example, a user-interface of an external computer, a tablet, a smartphone, a network, etc.).

Figure 14:
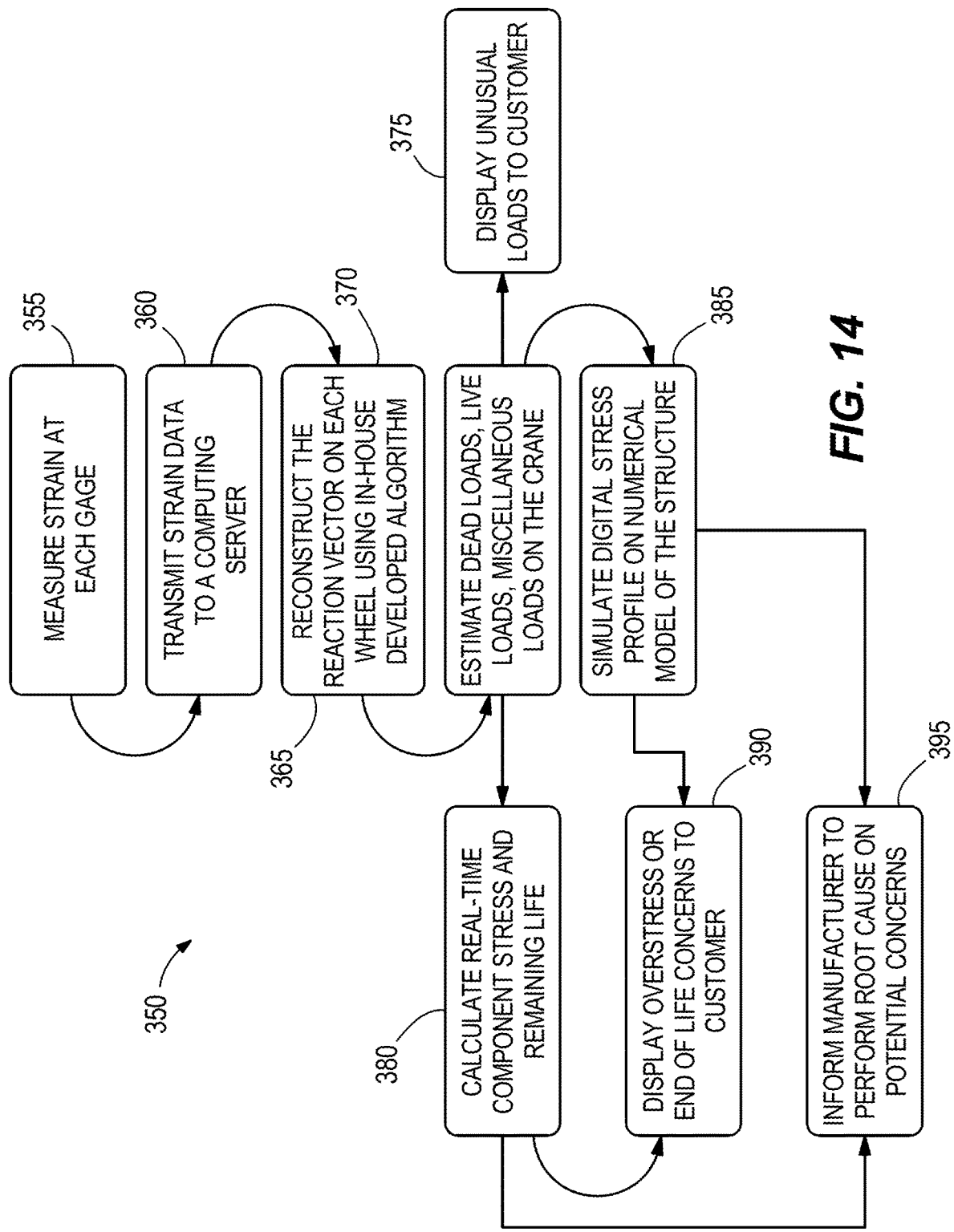
FIG. 14 is an additional flow diagram illustrating collection of data and use of the data from the health monitoring system.

FIG. 14 is a flow chart illustrating a process, or operation, 350 of the health monitoring system 186 according to some constructions. It should be understood that the order of the steps disclosed in the process 350 could vary. Furthermore, additional steps may be added and not all of the steps may be required. Furthermore, the process 350 may be performed via, or in conjunction with, the data acquisition system 200 and/or the main controller 204.

With continued reference to FIG. 14, a strain is sensed, or measured, at each axle 160 of the crane 10 (block 355) via one or more strain gauges 208 (or other load-measuring sensors). The strain data is transmitted (for example, via wired and/or wireless communication) to the data acquisition system 200 and/or the main controller 204 (block 360). The data acquisition system 200 and/or the main controller 204 reconstruct (for example, virtually reconstruct) one or more force, or load, vectors (for example, reaction vector(s)) for each wheel assembly 50, 70 (block 365). In some constructions, the reconstruction is performed via one or more algorithms. For example, three-dimensional triaxial loads ($F_X$, $F_Y$, $F_Z$), position of a wheel on a rail head (d) (see for example FIG. 2B), and/or angular position of one of the strain gauges ($\ominus$) may be determined by the main controller 204 and/or the data acquisition system 200 by solving a non-linear optimization problem with geometry constraints as follows:

Find ($F_X$, $F_Y$, $F_Z$, d, $\ominus$) which minimizes error below, and where $\varepsilon_c = f(F_X, F_Y, F_Z, d, \ominus)$ is the strain calculated using stress-strain relationships, and $\varepsilon_m$ is the measured strain.

$$\text{Error} = \Sigma_1^n (\varepsilon_{m_i} - \varepsilon_{c_i})^2$$

Additionally, in some constructions, the data acquisition system 200 and/or main controller 204 use the following equations below, which relate to stress ($\sigma_x$, $\sigma_y$, $\sigma_z$, $\tau_{xy}$, $\tau_{yz}$, $\tau_{xz}$)/strain ($\varepsilon_x$, $\varepsilon_y$, $\varepsilon_z$, $\gamma_{xy}$, $\gamma_{yz}$, $\gamma_{xz}$) relationship, to calculate stresses from strains measured by the strain gauges 208. Material properties are defined by Poisson's ratio (v), Young's modulus (E), and modulus of rigidity (G).

$$\sigma_x = \frac{E}{(1+v)(1-2v)}[(1-v)\varepsilon_x + v(\varepsilon_y + \varepsilon_z)]$$

$$\sigma_y = \frac{E}{(1+v)(1-2v)}[(1-v)\varepsilon_y + v(\varepsilon_z + \varepsilon_x)]$$

$$\sigma_z = \frac{E}{(1+v)(1-2v)}[(1-v)\varepsilon_z + v(\varepsilon_x + \varepsilon_y)]$$

$$\tau_{xy} = G\gamma_{xy}$$
$$\tau_{yz} = G\gamma_{yz}$$
$$\tau_{xz} = G\gamma_{xz}$$

In some constructions, the algorithms used by the data acquisition system 200 and/or main controller 204 estimate three directional forces including lateral movement and/or lateral forces on the wheel 120 along the direction B on the lateral axis 54, accounting for the continuous rotation of the strain gauges 208 mounted on the rotating axle 160.

In some constructions, the data acquisition system 200 and/or the main controller 204 may estimate at least one selected from a group consisting of one or more dead loads, live loads, and miscellaneous loads on the crane 10 (block 370). In some constructions, when an unusual load (for example, a load that is outside a predetermined range) occurs, an abnormal load condition may be output to a user (block 375).

The data acquisition system 200 and/or the main controller 204 may calculate, based on the estimated loads, real time component stresses and/or remaining lives of one or more components of the crane 10 (block 380). The data acquisition system 200 and/or the main controller 204 may also simulate a digital stress profile model of the crane 10 (block 385). Based on the real time component stresses, the remaining lives of the one or more components, and/or the digital stress profile models of the crane 10, an abnormal load condition may be output to a user (block 390) and/or a manufacturer may be notified (block 395).

The above methods, operations, and/or algorithms utilize the strain data from the strain gauges 208 to determine forces on a wheel in first, second, and third directions relative to the longitudinal, lateral, and vertical axes 42, 54, 110, respectively. Accordingly, the axle 160 itself acts as a self-transducer capable of measuring tri-axial loads, without any added external load cells. In other words, rather than using load cells to directly measure loads on a crane, the health monitoring system 186 instead uses sensors (e.g., strain gauges or other sensors) that gather data on strain (or in some constructions velocity, acceleration, and/or other data) and uses inverse methods to then estimate crane wheel reactions, rail straightness, components fatigue life etc.

In some constructions, the health monitoring system 186 is used to determine primary loads (e.g., loads on the wheel assembly 50, 70 due to the object being lifted by the lift mechanism 90 along the vertical axis 110), and secondary loads on the crane 10 due to various reasons such as, but not limited to: loads from inertia and braking, environmental loads (e.g., from wind, snow, etc.), loads from rail misalignment and/or other loads from misalignment of the crane 10 (e.g., crane squareness), loads from skewing, loads in a travel direction and relative position of wheel tread with respect to rail head width, and other loads in a travel direction of the wheel assembly 50, 70 (e.g., direction relative to the lateral axis 54 for each of the first wheel assemblies 50 or direction relative to the longitudinal axis 42 for each of the wheel assemblies 70).

Further, in some constructions, the health monitoring system 186 determines a relative position of the wheel 120 of each wheel assembly 50, 70 relative to its corresponding rail (e.g., the position of the wheel guiding groove 176 with respect to the guide region 114). This facilitates a determination of whether the first and second wheel flanges 124, 128 are in contact with the guide (e.g., guide region 114) of the rail. Accordingly, the health monitoring system 186 is capable of measuring a lateral load (i.e., load perpendicular to the travel direction of the wheel assembly 50, 70) applied to the wheel assembly 50, 70 during operation of the crane 10, as well as a vertical load.

In some constructions, the health monitoring system 186 (e.g., the main controller 204 of the health monitoring system 186) calculates or otherwise measures the health of the wheel assembly 50, 70 and the crane 10 overall, to determine the different secondary loads that are affecting the wheel assembly 50, 70, as well as the primary loads, and to determine whether one or more parts (e.g., the wheels 120 themselves, the axles 160, or the bearings, 164, 168) should be replaced or whether a failure is likely to occur within a given time period. For example, the health monitoring system 186 (e.g., the main controller 204) conducts one or more of the following: (1) estimates crane wheel reactions from all sources; (2) identifies issues pertaining to rail straightness, out of tolerance, or bridge frame squareness; (3) estimates remaining fatigue life of components in the wheel assembly 50, 70 (e.g., wheels 120, axles 160, wheel bearings 164, 168); (4) estimates remaining fatigue life of structural components in the crane 10 or in end trucks 190 (FIG. 1), end ties 194 (FIG. 1), or structural connections; (5) estimates remaining fatigue life of hoist reeving components including the hook block 106, the cable member 102, the drum 98, or speed reducers; (6) identifies where the trolley 30 is positioned on the frame 18 in real-time; and (7) simulates a real time digital stress profile on a numerical model of the structure/mechanical components of the crane 10. Overall, the health monitoring system 186 may significantly reduce crane maintenance cost for the user, and reduce warranty cost, by alerting the user ahead of time about the condition of the crane 10 and the loading that is occurring at the wheels 120. In some constructions, the continuous real-time wheel load data can be used on a numerical model to simulate a continuous real-time digital stress profile of major structural/mechanical components of the crane 10.

While the illustrated construction is a crane 10 generally for overhead use within a building, the health monitoring system 186 may be used with any type of equipment that uses a wheel or wheels and experiences loading from more than one direction during use. For example, as described above, in some constructions the crane 10 may not include a separate trolley 30, or may include a trolley 30 that travels along a single trolley rail or more than two trolley rails. In some constructions, the crane 10 only includes one or more frame members that are supported by one or more wheels 120 that travel along a rail. In all such constructions, the health monitoring system 186 may be used to monitor at least one of the wheels 120. Additionally, while the illustrated construction includes strain gauges 208 and wires 196 on each of the wheels 120, in other constructions the health monitoring system 186 includes strain gauges 208 and wires 196 on only the wheels 120 of the wheel assemblies 50, or on only the wheels 120 of the wheel assemblies 70, or on only one of the wheels 120 of each associated support member 136. In some constructions, the health monitoring system 186 includes strain gauges 208 and wires 196 on only one wheel 120 of the entire crane 10. Accordingly, the health monitoring system 186 may be implemented as desired to monitor loading in various manners.

Although the invention has been described in detail with reference to certain preferred constructions, variations and modifications exist within the scope and spirit of one or more independent aspects of the invention as described.

What is claimed is:

1. A health monitoring system, the health monitoring system comprising:
   a wheel assembly having a wheel and an axle defining an axis of rotation of the wheel, wherein the wheel is configured to move along a guiderail;
   a plurality of strain gauges coupled to the axle at circumferential locations around the axis of rotation, wherein the plurality of strain gauges are configured to continuously detect strains due to loads experienced at the wheel;
   a data acquisition system coupled to the wheel and configured to receive data from the plurality of strain gauges corresponding to detected strains
   a main controller coupled to the data acquisition system, wherein the main controller is configured to receive data from the data acquisition system corresponding to the detected strains, and to use the data to calculate the loads applied to a wheel-rail interface in all of a first direction, a second direction perpendicular to the first direction, and a third direction perpendicular to both the first direction and the second direction; and
   wherein the load calculated along the second direction is a lateral load against the wheel based on misalignment of a guiderail.

2. The health monitoring system of claim 1, further comprising wires coupled to the plurality of strain gauges and to the data acquisition system, and wherein the data acquisition system is positioned along a side surface of the wheel perpendicular to the axis of rotation of the wheel.

3. The health monitoring system of claim 2, wherein the wheel includes channels along the side surface of the wheel, and wherein the wires are disposed within the channels.

4. The health monitoring system of claim 1, wherein the main controller is wirelessly coupled to the data acquisition system.

5. The health monitoring system of claim 1, wherein the plurality of strain gauges includes five strain gauges positioned at 0 degrees, 72 degrees, 144 degrees, 216 degrees, and 288 degrees relative to the axis of rotation.

6. The health monitoring system of claim 1, wherein the main controller is configured to calculate a continuous real-time component of stress and a remaining life of the wheel assembly.

7. The health monitoring system of claim 1, wherein the main controller is configured to reconstruct a set of reaction vectors continuously in real-time at the wheel assembly.

8. The health monitoring system of claim 1, wherein the axle is a self-transducer configured to detect tri-axial loads, without the support of externally added load cells.

9. The health monitoring system of claim 1, wherein the main controller is configured to calculate at least one secondary load acting on the wheel assembly, the secondary load selected from a group consisting of: (1) a load from inertia, (2) a load from braking, (3) an environmental load from wind or snow, (4) a load from rail misalignment, and (5) a load from skewing.

10. A crane comprising:
   a frame member;
   the health monitoring system of claim 1, wherein the guiderail extends along a top of the frame member; and.

11. The crane of claim 10, wherein the frame member is configured to move along the first direction, and wherein the crane includes a trolley configured to move along the guiderail along the second direction.

12. The crane of claim 11, wherein the trolley includes a lift assembly having a hook configured to move along the third direction.

13. A crane comprising:
   a guiderail;
   a wheel assembly having a wheel and an axle defining an axis of rotation of the wheel, wherein the wheel is configured to move along the guiderail along a first direction;
   a plurality of strain gauges coupled to the axle at circumferential locations around the axis of rotation, wherein the plurality of strain gauges are configured to detect strains due to loads experienced at the wheel; and
   a controller coupled to the plurality of strain gauges, wherein the controller is configured to use the strains detected by the plurality of strain gauges to calculate lateral, longitudinal and vertical loads on the wheel along three orthogonal directions.

14. The crane of claim 13, further comprising a data acquisition system coupled to the plurality of strain gauges and to the wheel, and wherein the controller is wirelessly coupled to the data acquisition system.

15. The crane of claim 14, wherein the data acquisition system is coupled directly to a side surface of the wheel, and wherein wires extend between the plurality of strain gauges and the data acquisition system.

16. The crane of claim 15, wherein the wheel includes channels, and the wires are disposed within the channels.

17. The crane of claim 13, wherein the plurality of strain gauges include at least five strain gauges spaced circumferentially around the axle of the wheel.

18. The crane of claim 13, wherein the axle of the wheel is a self-transducer configured to detect tri-axial loads, without the support of externally added load cells.

19. A crane for use with a rail system, the crane comprising:
   a frame structure having at least one frame member, the frame member extending linearly between a first end and a second end to define a longitudinal axis of the crane, wherein the frame structure is configured to move in a first direction that is perpendicular to the longitudinal axis;
   a trolley movable along the frame structure in a second direction along the longitudinal axis, the trolley having a lift assembly, the lift assembly movable in a third direction that is perpendicular to the first direction and the second direction;
   a plurality of wheel assemblies for facilitating the movement of the frame structure relative to the rails and the movement of the trolley relative to the frame structure, each wheel assembly including a wheel and an axle defining an axis of rotation of the wheel, wherein one of the plurality of wheel assemblies includes a health monitoring system having
      a plurality of strain gauges selectively positioned on the axle for rotation with the axle,
      a wireless transmitter positioned on the wheel flange and electrically coupled to the plurality of strain gauges,
      a controller wirelessly coupled to the wireless transmitter, wherein data from the plurality of strain gauges is configured to be communicated in real time, via the wireless transmitter, to the controller, and
      wherein the controller is configured to use the data form the plurality of strain gauges to determine a force on the wheel in the first direction, in the second direction, and in the third direction.

* * * * *